US008903326B2

United States Patent
Gregg et al.

(10) Patent No.: US 8,903,326 B2
(45) Date of Patent: Dec. 2, 2014

(54) SIMULTANEOUS DOWNLINK TESTING FOR MULTIPLE DEVICES IN RADIO-FREQUENCY TEST SYSTEMS

(75) Inventors: Justin Gregg, San Francisco, CA (US); Adil Syed, Santa Clara, CA (US); Vishwanath Venkataraman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 396 days.

(21) Appl. No.: 13/018,348

(22) Filed: Jan. 31, 2011

(65) Prior Publication Data

US 2012/0122406 A1 May 17, 2012

Related U.S. Application Data

(60) Provisional application No. 61/413,959, filed on Nov. 15, 2010.

(51) Int. Cl.
*H04B 17/00* (2006.01)
*H04W 24/06* (2009.01)
*H04L 12/26* (2006.01)

(52) U.S. Cl.
CPC ........... *H04W 24/06* (2013.01); *H04L 12/2697* (2013.01); *H04L 43/50* (2013.01); *H04L 43/0882* (2013.01)
USPC ...................................................... 455/67.12

(58) Field of Classification Search
None
See application file for complete search history.

(56) References Cited

U.S. PATENT DOCUMENTS

| 7,155,653 | B2 | 12/2006 | Monnerat |
| 7,773,964 | B2 | 8/2010 | Ozaki et al. |
| 2002/0037033 | A1 | 3/2002 | During |
| 2002/0160717 | A1* | 10/2002 | Persson et al. ............... 455/67.1 |
| 2004/0092135 | A1* | 5/2004 | Hofmeister et al. ............ 439/39 |
| 2005/0093606 | A1* | 5/2005 | Kaiser, Jr. ..................... 327/308 |
| 2005/0176376 | A1 | 8/2005 | Liu |

(Continued)

FOREIGN PATENT DOCUMENTS

| WO | 2009105885 | 9/2009 |
| WO | 2010031879 | 3/2010 |

OTHER PUBLICATIONS

Ma et al., A Review of Electromagnetic Compatibility/Interference Measurement Methodologies, Mar. 1985, Proceedings of the IEEE, vol. 73 No. 3, pp. 388-411.*
Gregg et al., U.S. Appl. No. 61/413,953, filed Nov. 15, 2010.

*Primary Examiner* — Nay A Maung
*Assistant Examiner* — Alejandro Rivero
(74) *Attorney, Agent, or Firm* — Treyz Law Group; Jason Tsai; Michael H. Lyons

(57) ABSTRACT

A test station may include a test host, a signal generator, and a test chamber. Multiple devices under test (DUTs) may be placed in the test chamber during production testing. Radio-frequency signals may be conveyed from the signal generator to the multiple DUTs using a conducted arrangement through a radio-frequency signal splitter circuit or using a radiated arrangement through an antenna in the test chamber. The signal generator may broadcast initialization downlink signals. The multiple DUTs may synchronize with the initialing downlink signals. The signal generator may broadcast test downlink signals at a target output power level. The multiple DUTs may receive the test downlink signals and compute a corresponding downlink transmission performance level based on the received downlink signals. A given DUT is marked as a passing DUT if the downlink performance level is satisfactory. A given DUT may be retested if the downlink performance level fails design criteria.

14 Claims, 5 Drawing Sheets

(56) References Cited

U.S. PATENT DOCUMENTS

| | | | |
|---|---|---|---|
| 2006/0017630 A1* | 1/2006 | Kildal .......................... 343/703 |
| 2007/0072599 A1 | 3/2007 | Romine et al. |
| 2007/0091814 A1 | 4/2007 | Leung et al. |
| 2007/0164755 A1* | 7/2007 | Stojcevic ..................... 324/627 |
| 2007/0207757 A1* | 9/2007 | Qi et al. ..................... 455/226.1 |
| 2007/0243825 A1* | 10/2007 | Olgaard et al. ............ 455/67.11 |
| 2007/0275667 A1 | 11/2007 | Leung et al. |
| 2008/0214117 A1* | 9/2008 | Zhao et al. ................. 455/67.12 |
| 2010/0123471 A1 | 5/2010 | Olgaard et al. |
| 2011/0103446 A1* | 5/2011 | Chen et al. .................... 375/224 |

\* cited by examiner

SIMULTANEOUS DOWNLINK TESTING FOR MULTIPLE DEVICES IN RADIO-FREQUENCY TEST SYSTEMS

This application claims the benefit of provisional patent application No. 61/413,959, filed Nov. 15, 2010, which is hereby incorporated by reference herein in its entirety.

BACKGROUND

This relates generally to testing wireless electronic devices and more particularly, to testing multiple wireless electronic devices placed in a test chamber.

Wireless electronic devices typically include transceiver circuitry, antenna circuitry, and other radio-frequency circuitry that provide wireless communications capabilities. During testing, wireless electronic devices under test (DUTs) can exhibit different performance levels. For example, each wireless DUT in a group of DUTs can exhibit its own output power level, gain, frequency response, efficiency, linearity, dynamic range, etc.

The performance of a wireless DUT can be measured using a radio-frequency (RF) test station. An RF test station typically includes a test host, a tester (e.g., a signal generator), and a test chamber. The signal generator is connected to the test host. Arranged in this way, the test host configures the signal generator to transmit radio-frequency signals during test operations.

In conventional radio-frequency test arrangements, a wireless DUT is placed into the test chamber. The DUT is connected to the test host using a control cable. The test host directs the signal generator to broadcast downlink signals at a predetermined output power level to the DUT over a wireless path or a wired path. The test host directs the DUT to synchronize with the downlink signals broadcast from the signal generator.

The DUT receives the downlink signals. The received downlink signals exhibit a power level that is substantially less than the predetermined output power level (e.g., the power level of the received downlink signals may be 20 dB less than the predetermined output power level). The DUT analyzes the received downlink signals and determines whether the received downlink signals satisfy performance criteria. For example, the DUT can compute a bit error rate based on the received downlink signals. If the bit error rate is less than a predetermined threshold, the DUT is marked as a passing DUT. If the bit error rate is greater than the predetermined threshold, the DUT is marked as a failing DUT.

After the DUT has been marked as a passing DUT or a failing DUT, the DUT is disconnected from the test host (i.e., by unplugging the control cable from the DUT) and is removed from the test chamber. To test additional DUTs, an additional DUT is connected to the test host (i.e., by plugging the control cable into a corresponding mating connector in the additional DUT) and is placed into the test chamber for downlink testing.

Wireless testing using this conventional approach may be inefficient, because the process of connecting a DUT to the test host, placing the DUT in the test chamber, testing the DUT, removing the DUT from the test chamber, and disconnecting the DUT from the test host one DUT at a time is time-consuming.

It would therefore be desirable to be able to provide improved ways of performing downlink testing.

SUMMARY

Test stations in a radio-frequency test system can be used to perform wireless testing on wireless devices under test (DUTs). Each test station may include a test host, a signal generator, and a test chamber. During wireless testing, more than one DUT may be placed within the test chamber.

In one suitable test arrangement, the tester may be coupled to the multiple DUTs in the test chamber through a radio-frequency signal splitter circuit. In particular, the DUTs may include transceiver circuits that are electrically connected to the coupling circuit through radio-frequency cables. Testing the DUTs using this conducted test setup bypasses over-the-air transmission.

In another suitable test arrangement, radio-frequency signals may be conveyed between the signal generator and the multiple DUTS through a test antenna that is placed within the test chamber. The antenna may transmit and receive radio-frequency signals to and from the multiple DUTs in the test chamber. Testing the DUTs using this radiated test setup takes into account the effect of over-the-air transmission.

Whether the multiple DUTs are tested using the conducted arrangement or the radiated arrangement, downlink sensitivity testing may be performed on the multiple DUTs within a test chamber. Downlink sensitivity (or receive signal power sensitivity) may be defined as the minimum receive signal power level for which the received radio-frequency signals exhibit performance levels (e.g., link performance data) that satisfy design criteria.

During downlink testing, the test host may direct the signal generator to broadcast initialization radio-frequency signals. The test host may direct each of the multiple DUTs to synchronize with the initializing signals in parallel. After each of the DUTs has been synchronized, the test host may direct the signal generator to broadcast test radio-frequency signals at a target output power level. The target output power level may be computed based on path loss values associated with each of the multiple DUTs in the test chamber and a target sensitivity level (e.g., a sensitivity level selected so that at least 99% of DUTs will satisfy performance criteria and be marked as passing DUTs during production testing).

The DUTs may receive the test downlink signals. The DUTs may analyze the received test downlink signals and compute a communications link performance level based on the received test signals. For example, the DUTs may each calculate a symbol error rate, frame error rate, bit error rate, packet error rate, and other performance metrics based on the received test signals. If a given DUT exhibits a calculated performance level that satisfies design criteria, the given DUT will be marked as a passing DUT. If a given DUT exhibits a calculated performance level that is unsatisfactory, the given DUT may be retested using other test configurations (e.g., the given DUT may be retested based on a new target output power level, may be retested in a different location in the test chamber, may be retested in another test station, etc.).

Further features of the present invention, its nature and various advantages will be more apparent from the accompanying drawings and the following detailed description.

DETAILED DESCRIPTION

Wireless electronic devices include antenna and transceiver circuitry that support wireless communications. Examples of wireless electronic devices include desktop computers, computer monitors, computer monitors containing embedded computers, wireless computer cards, wireless adapters, televisions, set-top boxes, gaming consoles, routers, or other electronic equipment. Examples of portable wireless electronic devices include laptop computers, tablet computers, handheld computers, cellular telephones, media players, and small devices such as wrist-watch devices, pendant devices, headphone and earpiece devices, and other miniature devices.

Devices such as these are often provided with wireless communications capabilities. For example, electronic devices may use long-range wireless communications circuitry such as cellular telephone circuitry to communicate using cellular telephone bands at 850 MHz, 900 MHz, 1800 MHz, and 1900 MHz (e.g., the main Global System for Mobile Communications or GSM cellular telephone bands). Long-range wireless communications circuitry may also handle the 2100 MHz band.

Electronic devices may use short-range wireless communications links to handle communications with nearby equipment. For example, electronic devices may communicate using the WiFi® (IEEE 802.11) bands at 2.4 GHz and 5 GHz and the Bluetooth® band at 2.4 GHz. It is sometimes desirable to receive satellite navigation system signals such as signals from the Global Positioning System (GPS). Electronic devices may therefore be provided with circuitry for receiving satellite navigation signals such as GPS signals at 1575 MHz.

Figure 1:
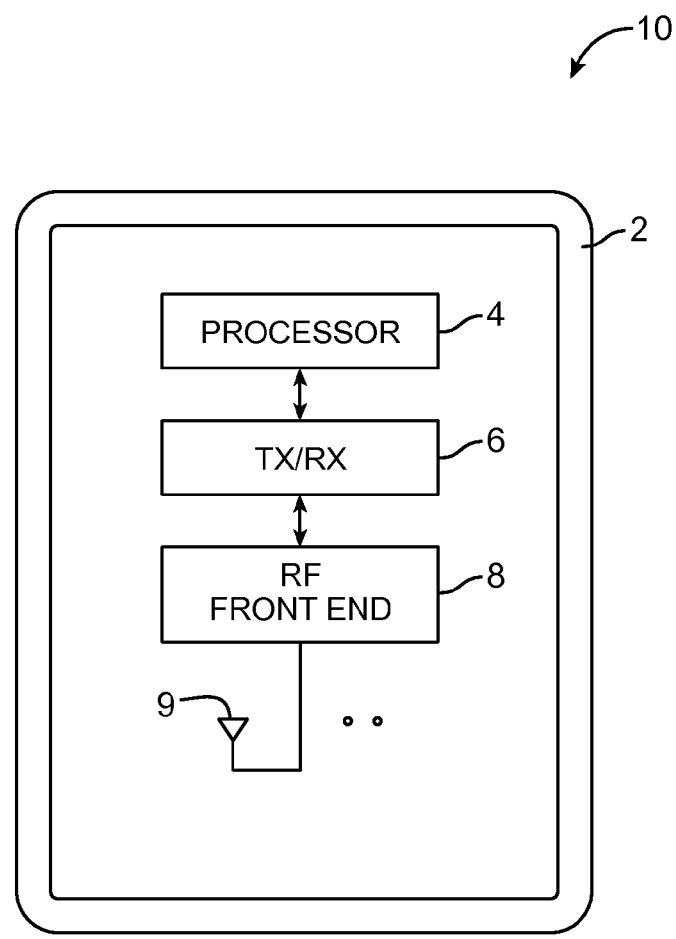
FIG. 1 is a diagram of an illustrative wireless device under test with radio-frequency circuitry in accordance with an embodiment of the present invention.

In testing environments, the wireless electronic devices are sometimes referred to as devices under test (DUTs). FIG. 1 shows an example of a test device such as DUT 10. DUT 10 may be a portable electronic device, a cellular telephone, a computer, a multimedia device, or other electronic equipment. DUT 10 may have a device housing such as housing 2 that forms a case for its associated components.

DUT 10 may have storage and processing circuitry such as storage and processing circuitry 4. Storage and processing circuitry 4 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 4 may be used to control the operation of device 10. This processing circuitry may be based on one or more microprocessors, microcontrollers, digital signal processors, application specific integrated circuits, etc.

Circuitry 4 may interact with a transceiver circuit such as transceiver circuit 6. Transceiver circuit 6 may include an analog-to-digital converter (ADC), a digital-to-analog converter (DAC), a digital down-converter (DDC), and a digital up-converter (DUC).

In a scenario in which DUT 10 is transmitting, circuitry 4 may provide digital data (e.g., baseband signals) to the DUC. The DUC may convert or modulate the baseband digital signals to an intermediate frequency (IF). The IF digital signals may be fed to the DAC to convert the IF digital signals to IF analog signals. The IF analog signals may then be fed to an RF front end such as RF front end 8.

When DUT 10 is receiving wireless signals, RF front end 8 may provide incoming IF analog signals to the ADC. The ADC may convert the incoming IF analog signals to incoming IF digital signals. The incoming IF digital signals may then be fed to the DDC. The DDC may convert the incoming IF digital signals to incoming baseband digital signals. The incoming baseband digital signals may then be provided to circuitry 4 for further processing. Transceiver circuit 6 may either up-convert baseband signals to IF signals or down-convert IF signals to baseband signals. Transceiver block 6 may therefore sometimes be referred to as an IF stage.

RF front end 8 may include circuitry that couples transceiver block 6 to one or more antenna such as antenna 9. RF front end 8 may include circuitry such as matching circuits, band-pass filters, mixers, low noise amplifier circuitry, power amplifier circuitry, etc. Circuitry 4, transceiver block 6, RF front end 8, and antenna 9 may be housed within housing 2.

In the scenario in which DUT 10 is transmitting, RF front end 8 may up-convert the IF analog signals from transceiver block 6 to RF analog signals (e.g., the RF signals typically have higher frequencies than the IF signals). The RF analog signals may be fed to antenna 9 for broadcast. If desired, more than one antenna may be used in DUT 10.

In the scenario in which DUT 10 is receiving wireless signals, antenna 9 may receive incoming RF analog signals from a broadcasting device such as a base transceiver station, network access point, etc. The incoming RF analog signals may be fed to RF front end 8. RF front end 8 may down-convert the incoming RF analog signals to IF analog signals. The IF analog signals may then be fed to transceiver circuit 6 for further data processing.

Examples of cellular telephone standards that may be supported by the wireless circuitry of device 10 include: the Global System for Mobile Communications (GSM) "2G" cellular telephone standard, the Evolution-Data Optimized (EVDO) cellular telephone standard, the "3G" Universal Mobile Telecommunications System (UMTS) cellular telephone standard, the "3G" Code Division Multiple Access 2000 (CDMA 2000) cellular telephone standard, and the "4G" Long Term Evolution (LTE) cellular telephone standard. Other cellular telephone standards may be used if desired. These cellular telephone standards are merely illustrative.

Figure 2:
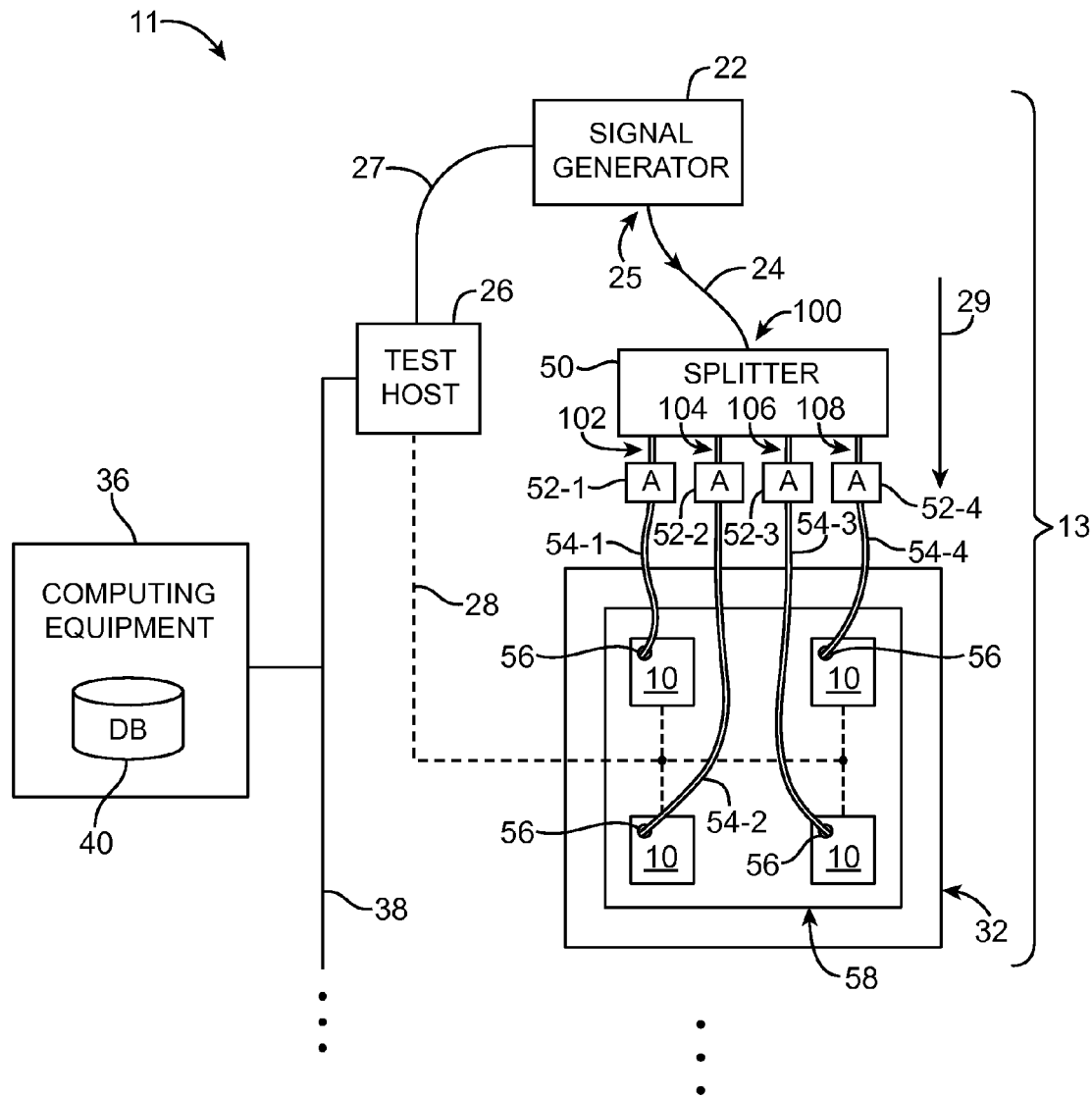
FIG. 2 is a diagram of illustrative test stations each connected to computing equipment and each including a test host, a signal generator, a radio-frequency signal splitter, and a test chamber in accordance with an embodiment of the present invention.

During testing, many wireless devices (e.g., hundreds, thousands, or more of DUTs 10) may be tested in a test system such as test system 11 of FIG. 2. Test system 11 may include test accessories, computers, network equipment, tester control boxes, cabling, test chambers, test antennas within the test chambers, and other test equipment for transmitting and receiving radio-frequency test signals and gathering test results. Test system 11 may include multiple test stations such as test stations 13. There may, for example, be 80 test stations 13 at a given test site. Test system 11 may include any desired number of test stations to achieve desired test throughput.

Each test station 13 may include a test host such as test host 26, a signal generator such as signal generator 22, and a test chamber such as test chamber 32. Test host 26 may, for example, be a personal computer or other types of computing equipment.

Signal generator 22 may be a radio communications tester of the type that is sometimes referred to as a call box or a base station emulator. Signal generator 22 may, for example, be the CMU300 Universal Radio Communication Tester available from Rohde & Schwarz. Signal generator 22 may be used to emulate the behavior of a base transceiver station during a telephone call with a wireless device under test (as an example). If desired, signal generator 22 may be configured to emulate the behavior of a network access point to test the ability of transceiver 6 to support the WiFi® communications protocol, the Bluetooth® communications protocol, or other communications standards.

Signal generator 22 may be operated directly or via computer control (e.g., when signal generator 22 receives commands from test host 26). When operated directly, a user may control signal generator 22 by supplying commands directly to the signal generator using the user input interface of signal generator 22. For example, a user may press buttons in a control panel on the signal generator while viewing information that is displayed on a display in generator 22. In computer controlled configurations, a test host such as computer 26 (e.g., software running autonomously or semi-autonomously on the computer) may communicate with signal generator 22 (e.g., by sending and receiving data over a wired path 27 or a wireless path between the computer and the signal generator).

During testing, more than one DUT 10 may be placed within test chamber 32. Test chamber 32 may have a cubic structure (six planar walls), a rectangular prism-like structure (six rectangular walls), a pyramid structure (four triangular walls with a rectangular base), or other suitable structures.

Multiple DUTs 10 may be attached to a test structure such as test structure (test tray) 58 within test chamber 32. Test tray 58 may serve to secure DUTs 10 in desired locations within test chamber 32.

DUTs 10 may be coupled to test host 26 through wired path 28 (e.g., data signals may be conveyed between test host 26 and a respective DUT over data path 28). Connected in this way, test host 26 may send commands over bus 28 to configure DUTs 10 to perform desired operations during testing. Test host 26 and DUTs 10 may be interconnected using a Universal Serial Bus (USB) cable, a Universal Asynchronous Receiver/Transmitter (UART) cable, or other types of cabling (e.g., bus 28 may be a USB-based connection, a UART-based connection, or other types of connections).

In one suitable arrangement, DUTs 10 may be coupled to signal generator 22 through a radio-frequency signal splitter such as RF signal splitter 50. As shown in FIG. 2, splitter 50 may have a given port 100 that is connected to signal generator 22 through radio-frequency cable 24 (e.g., a coaxial cable). Splitter 50 may include additional ports each of which is coupled to respective DUTs 10.

For example, circuit 50 may have a first port 102 that is electrically coupled to a first DUT using RF cable 54-1, a second port 104 that is electrically coupled to a second DUT using RF cable 54-2, a third port 106 that is electrically coupled to a third DUT using RF cable 54-3, and a fourth port 108 that is electrically coupled to a fourth DUT using RF cable 54-4. Cable 54-1 may be directly connected to transceiver 6 of first DUT 10 (e.g., cable 54-1 may have an RF connector that mates with corresponding RF connector 56 in first DUT 10). Cable 54-2 may be directly connected to transceiver 6 of second DUT 10 (e.g., cable 54-2 may have an RF connector that mates with corresponding RF connector 56 in second DUT 10). Cable 54-3 may be directly connected to transceiver 6 of third DUT 10 (e.g., cable 54-3 may have an RF connector that mates with corresponding RF connector 56 in third DUT 10). Cable 54-4 may be directly connected to transceiver 6 of fourth DUT 10 (e.g., cable 54-4 may have an RF connector that mates with corresponding RF connector 56 in fourth DUT 10).

Testing DUTs 10 using this type of arrangement may be referred to as conducted testing, because directly tapping into transceivers 6 bypasses over-the-air (radiated) transmission (e.g., antennas 9 of DUTs 10 are not in use during conducted testing). Cables 54-1, 54-2, 54-3, and 54-4 may be, for example, miniature coaxial cables with diameters that are less than 2 mm (e.g., 0.81 mm, 1.13 mm, 1.32 mm, 1.37 mm, etc.), whereas cable 24 may be, for example, a cable with a diameter of about 2-5 mm (as an example).

As shown in FIG. 2, power attenuators may be coupled between splitter 50 and DUTs 10. For example, attenuator 52-1 may be interposed in the signal path connecting port 102 to first DUT 10 (e.g., radio-frequency signals may be conveyed from port 102 to first DUT 10 through attenuator 52-1 over cable 54-1). Attenuator 52-2 may be interposed in the signal path connecting port 104 to second DUT 10 (e.g., radio-frequency signals may be conveyed from port 104 to second DUT 10 through attenuator 52-2 over cable 54-2). Attenuator 52-3 may be interposed in the signal path connecting port 106 to third DUT 10 (e.g., radio-frequency signals may be conveyed from port 106 to third DUT 10 through attenuator 52-3 over cable 54-3). Attenuator 52-4 may be interposed in the signal path connecting port 108 to fourth DUT 10 (e.g., radio-frequency signals may be conveyed from port 108 to fourth DUT 10 through attenuator 52-4 over cable 54-4).

The attenuators (i.e., attenuators 52-1, 52-2, 52-3, and 52-4) may serve to provide impedance matching (e.g., to provide an impedance of 50 ohms, 75 ohms, 100 ohms, or other impedance values) and to reduce signal leakage among DUTs 10. For example, consider a scenario in which first DUT 10 receives a first set of RF signals. The first set of received signals may have a power level of −100 dBm (as an example). A portion of the first set of RF signals may be reflected back towards port 102 of splitter 50. These reflected signals may leak undesirably into ports 104, 106, and 108 of splitter 50. The attenuators may attenuate these reflected leakage signals by 40 dB (as an example) so that the reflected leakage signals do not interfere with test signals transmitted by signal generator 22. In this example, the reflected leakage signals received by second, third, and fourth DUTs 10 may have power levels that are less than −140 dBm (−100 minus 40). Attenuating the reflected leakage signals using this approach may minimize signal interference among the multiple DUTs.

Radio-frequency signals may be transmitted in a downlink direction (as indicated by arrow 29) from signal generator 22 to DUTs 10 through splitter circuit 50. During downlink signal transmission, test host 26 may direct signal generator 22 to generate RF test signals at its output port 25. Splitter 50 may receive the test signals generated by signal generator 22 through port 100. Splitter 50 may split the received signals into multiple reduced-power versions of the received signals. The reduced-power versions of the received signals may be routed to respective ports 102, 104, 106, and 108. Configured using this arrangement, DUTs 10 may each receive reduced-power versions of the test signals generated by signal generator 22.

Radio-frequency signals transmitted from signal generator 22 to a given DUT 10 and radio-frequency signals transmitted from signal generator 22 to a different DUT 10 may experience different path loss values. Path loss is defined as the attenuation in power as radio-frequency signals propagate through a particular medium/channel.

Sources of path loss that may exist between signal generator 22 and a given DUT 10 include first cable path loss (e.g., path loss associated with cable 24), splitter path loss (e.g., power reduction introduced when splitter 50 is used to split radio-frequency signals into multiple reduced-power versions), attenuator path loss (e.g., power attenuation provided by attenuators 52-1, 52-2, 52-3, and 52-4), and second cable path loss (e.g., path loss associated with cables 54-1, 54-2, 54-3, or 54-4). Sources of path loss offset that exist from one downlink signal path to another may include variations in each attenuator (e.g., process, voltage, and temperature variations that may affect the operation of attenuators 52-1, 52-2, 52-3, and 52-4), variations in RF cable path loss (e.g., path loss associated with RF cables 54-1, 54-2, 54-3, and 54-3), and other sources of variation.

For example, a first set of RF signals transmitted from signal generator 22 to first DUT 10 may experience a path loss of 10.3 dB, whereas a second set of RF signals transmitted from signal generator 22 to second DUT 10 may experience a path loss of 9.8 dB (as an example). The path loss associated with each DUT 10 for the test setup of FIG. 2 may be characterized prior to production testing.

The test setup of FIG. 2 is merely illustrative. More than four DUTs 10 or less than four DUTs 10 may be mounted on tray 58 during test operations. Splitter 50 may include a sufficient number of ports to accommodate the desired number of DUTs 10. For example, consider a scenario in which eight DUTs 10 are attached to tray 58 in test chamber 32. Circuit 50 may therefore include port 100 that is coupled to signal generator 22 and eight additional ports that are coupled to respective DUTs 10 (as an example).

Test tray 58 may or may not be placed within test chamber 32. If test chamber 32 is used, test chamber 32 may serve to isolate DUTs 10 that are placed within test chamber 32 from external sources of radiation, interference, and noise so that DUTs 10 are being tested in a controlled environment.

Figure 3:
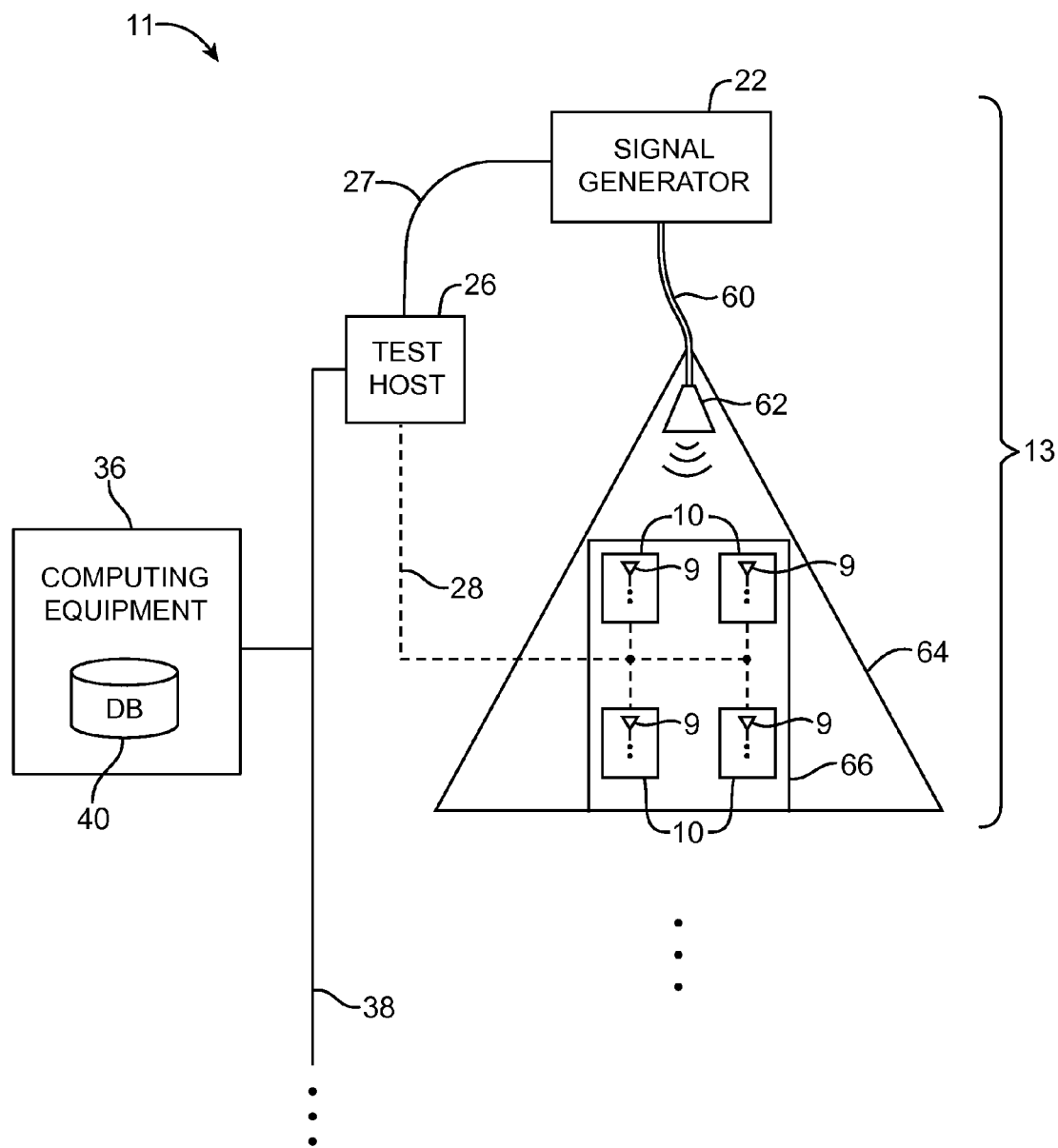
FIG. 3 is a diagram of illustrative test stations each connected to computing equipment and each including a test host, a signal generator, a test chamber, and an antenna in the test chamber in accordance with an embodiment of the present invention.

FIG. 3 shows another suitable arrangement of test stations 13. As shown in FIG. 3, test station 13 may be configured to perform over-the-air (OTA) testing (sometimes referred to as radiated testing). In the test setup of FIG. 3, signal generator 22 is connected to a test antenna such as antenna 62 through RF cable 60. Antenna 62 may be a microstrip antenna such as a microstrip patch antenna, a horn antenna, or other types of antennas.

Antenna 62 may be placed within a test chamber such as test chamber 64. Test chamber 64 may, for example, be a pyramidal-shaped transverse electromagnetic (TEM) cell. TEM cell 64 may be used to perform electromagnetic compatibility (EMC) radiated tests without interference from ambient electromagnetic environment. Multiple DUTs 10 may be placed within test chamber 64 during wireless testing.

During downlink signal transmission, signal generator 22 may generate radio-frequency test signals. Antenna 62 may wirelessly transmit the test signals to DUTs 10 in TEM cell 64 (as an example). Antennas 9 in DUTs 10 may receive the radiated test signals.

Radio-frequency signals transmitted over-the-air from signal generator 22 to a given DUT 10 and radio-frequency signals transmitted over-the-air from signal generator 22 to a different DUT 10 may experience different path loss values. Sources of path loss that exist between signal generator 22 and a given DUT 10 in the wireless test setup of FIG. 3 may include RF cable path loss (e.g., path loss associated with cable 60), antenna path loss (e.g., path loss associated with antenna 62), and over-the-air (OTA) path loss (e.g., e.g., path loss associated with the propagation of radio-frequency signals as they propagate through air). Sources of path loss offset that exist from one downlink signal path to another may include variations in OTA path loss, variations in the location of the different DUTs in test chamber 64, and other sources of variation.

For example, a first set of RF signals transmitted from signal generator 22 to first DUT 10 may experience a path loss of 40.3 dB, whereas a second set of RF signals transmitted from signal generator 22 to second DUT 10 may experience a path loss of 39.8 dB (as an example). The path loss associated with each DUT 10 for the test setup of FIG. 3 may be characterized prior to production testing.

As shown in FIGS. 2 and 3, each test station 13 may be connected to computing equipment 36 through line 38. Computing equipment 36 may include storage equipment on which a database 40 is stored. Test measurements obtained during test operations may be stored in database 40.

During production testing, pass/fail criteria may be applied to each DUT based on a DUT's ability to receive radio-frequency signals. The ability of DUT 10 to receive radio-frequency signals may be quantified by a receive signal sensitivity level (or downlink sensitivity). Downlink sensitivity may be defined as the minimum receive signal power level for which the received radio-frequency signals exhibit performance levels that satisfy design criteria.

For example, consider a scenario in which a maximum acceptable bit error rate is specified to be equal to two percent. A given DUT may receive RF signals. If the power level of the received RF signals is equal to −99 dBm, the bit error rate may be equal to 1.9%. If the power level of the received RF signals is equal to −100 dBm, the bit error rate may be equal to 2.0%. If the power level of the received RF signals is equal −101 dBm, the bit error rate may be equal to 2.1%. In this example, the downlink sensitivity of the given DUT is equal to −100 dBm, because RF signals with power levels that are less than −100 dBm result in unacceptable bit error rates for the given DUT. Testing the receive signal sensitivity of electronic devices during production testing may sometimes be referred to as performing downlink sensitivity testing.

Figure 4:
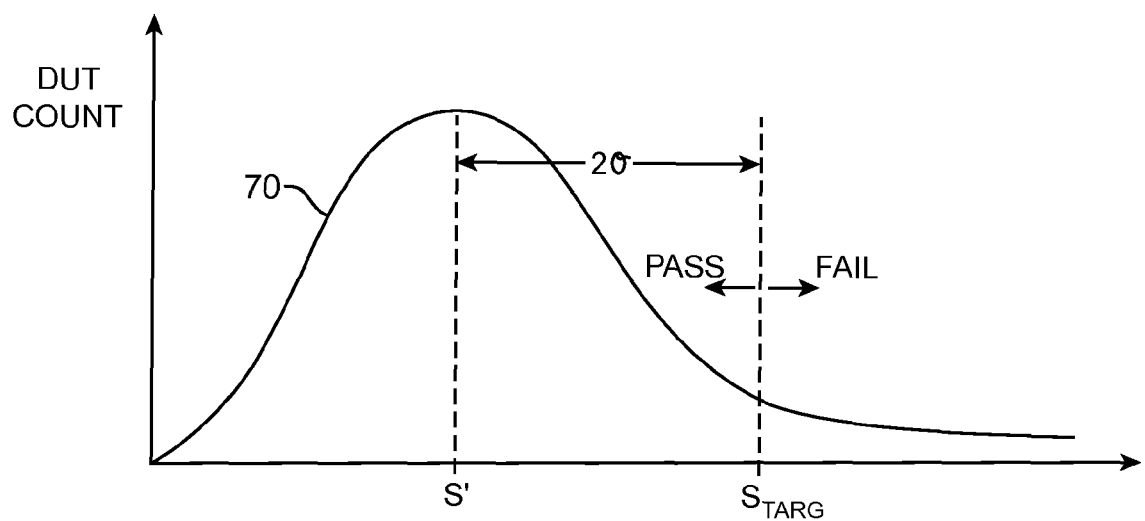
FIG. 4 is a plot illustrating a statistical distribution of receive signal power sensitivity for wireless devices under test in accordance with an embodiment of the present invention.

FIG. 4 is a frequency distribution plot showing a statistical distribution of DUT downlink sensitivity. Sensitivity characteristic curve 70 may be obtained by testing hundreds or thousands of DUTs 10 and measuring their sensitivity levels. Curve 70 may have a peak DUT count that corresponds to sensitivity level S'. Sensitivity level S' may correspond to the median, mean (average), or mode of an entire set of measured downlink sensitivity values (e.g., sensitivity S' is the most frequently occurring receive signal sensitivity level).

As shown in FIG. 4, curve 70 may have a substantially Gaussian profile. A majority of DUTs 10 may exhibit sensitivity levels that are within one standard deviation (e.g., one sigma) of sensitivity level S'. Approximately 68% of DUTs 10 may exhibit sensitivity levels that are within one standard deviation of sensitivity level S'. Approximately 95% of DUTs 10 may exhibit sensitivity levels that are within two standard deviations of sensitivity level S'.

It may be desirable to test the ability of production DUTs to receive RF signals at a low power level corresponding to a target sensitivity level $S_{TARG}$ (e.g., a sensitivity level that is at least two standard deviations greater than S'). For example, sensitivity level S' may be equal to −112 dBm, whereas target sensitivity level $S_{TARG}$ may be equal to −110 dBm.

During production testing, a given DUT may, for example, receive RF signals having a power level of −110 dBm. If the given DUT receives the RF signals and the received RF signals exhibit acceptable error rate performance, the given DUT has a sensitivity level that is lower than −110 dBm and will be marked as a passing DUT. If the given DUT receives the RF signals and the received RF signals exhibit unacceptable error rate performance, the given DUT has a sensitivity level that is greater than −110 dBm and will be marked as a failing DUT. A suitable $S_{TARG}$ may be selected so that 99.5% of DUTs will satisfy performance criteria and be marked as passing DUTs during production testing (as an example).

Figure 5:
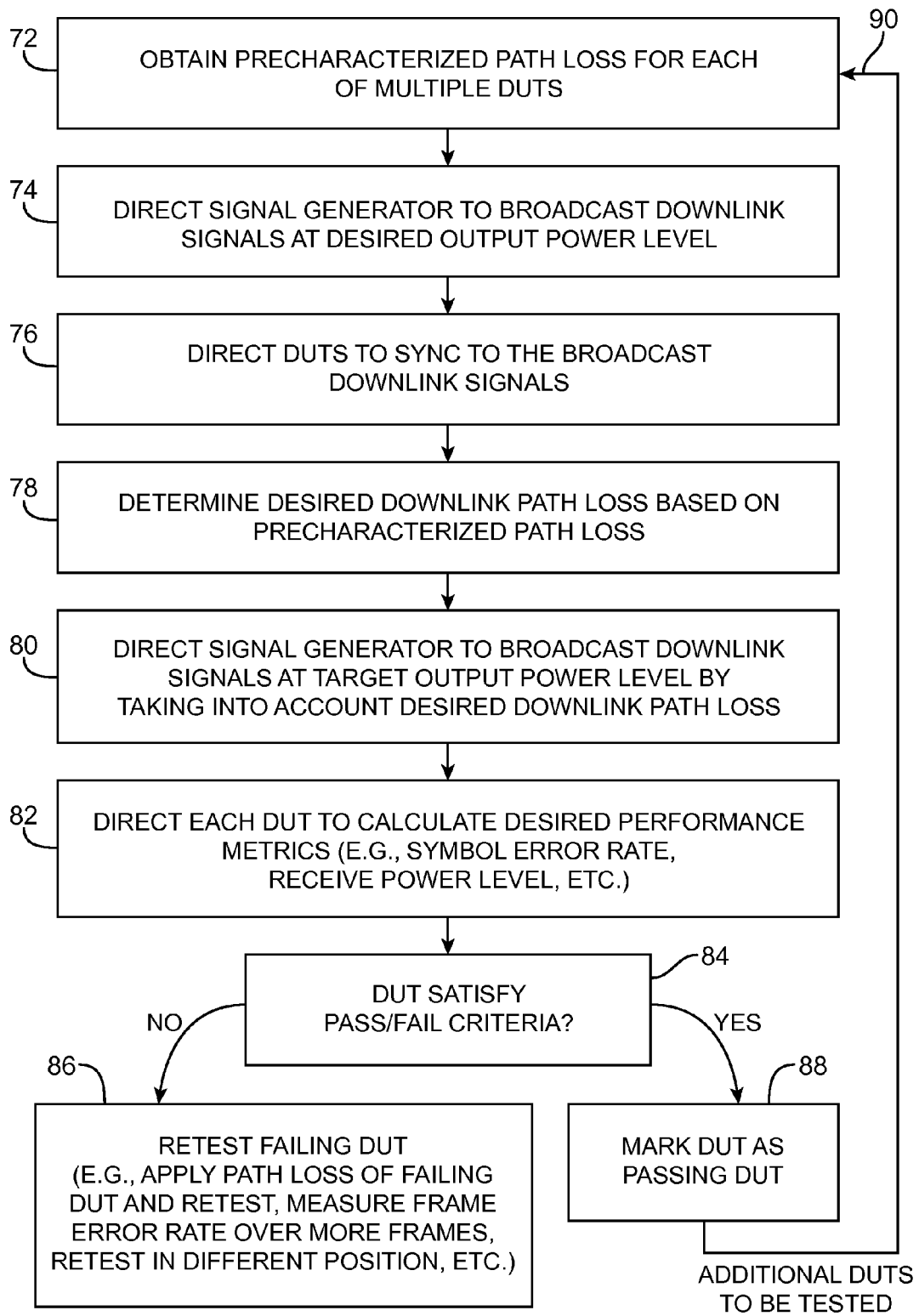
FIG. 5 is a flow chart of illustrative steps involved in performing simultaneous downlink sensitivity testing for multiple devices under test that are placed within a test chamber in accordance with an embodiment of the present invention.

FIG. 5 shows illustrative steps involved in downlink sensitivity testing. At step 72, pre-characterized path loss for each DUT 10 in the test chamber (e.g., test chamber 32 of FIG. 2 or test chamber 64 of FIG. 3) may be obtained. Path loss may be characterized using conventional path loss characterization techniques prior to step 72.

At step 74, test host 26 may direct signal generator 22 to broadcast RF initialization signals at a desired output power level (e.g., at a maximum output power level). The initialization test signals may be grouped into frames for protocol-compliant transmission (e.g., the downlink RF test signals may be organized into groups of digital signals that are transmitted by DUT 10 when DUT 10 is used to transmit protocol-compliant data). For example, each frame may include control information such as a frame header and a frame trailer and may include user data (sometimes referred to as payload). The frame header may include information such as a preamble, start frame delimiter, source and destination address, and other control information, whereas the frame trailer may include information such as cyclic redundancy check bits and other sequencing information (as an example).

For example, signal generator 22 may be configured to emulate the behavior of a base transceiver station during a telephone call with a wireless device under test and to transmit data frames over a GSM-compliant link. As another example, signal generator 22 may be configured to emulate the behavior of a network access point and to transmit data packets over a WiFi-compliant link.

At step 76, test host 26 may direct DUTs 10 in the test chamber to synchronize with the initialization signals broadcast from signal generator 22 (e.g., to synchronize signal generator 22 to the Global System for Mobile Communications (GSM) time division multiple access (TDMA) timing 26-multiframe structure). DUTs 10 are synchronized when they transmit uplink signals with frame headers and trailers that are respectively aligned with the frame headers and trailers of the downlink initialization signals broadcast from signal generator 22.

At step 78, test host 26 may determine a desired downlink path loss based on the pre-characterized path loss values. For example, consider a scenario in which the path loss associated with a first DUT in a test chamber is equal to 10 dB, the path loss associated with a second DUT in the test chamber is equal to 10.5 dB, the path loss associated with the third DUT in the test chamber is equal to 9 dB, and the path loss associated with a fourth DUT in the test chamber is equal to 10.1 dB. Test host 26 may select the least amount of path loss as the desired downlink path loss (e.g., test host 26 may select 9 dB path loss associated with the third DUT as the desired downlink path loss for downlink sensitivity testing). Selecting the least amount of path loss in this way ensures testing DUTs in a worst case scenario. If desired, test host 26 may compute the desired downlink path loss by calculating an average path loss value based on the different path loss values associated with each of the four DUTs.

At step 80, test host 26 may direct signal generator 22 to broadcast downlink test signals at a target output power level by taking into account the desired downlink path loss and target test sensitivity level $S_{TARG}$. The target output power level may be calculated by adding the magnitude of the desired path loss value (i.e., the path loss value selected during step 78) to target sensitivity level $S_{TARG}$. For example, if $S_{TARG}$ is equal to −110 dBm and the desired path loss value is equal to 9 dB, the target output power level will be equal to −101 dBm (−110 plus 9).

At step 82, each DUT 10 may calculate desired transmission performance metric data (or communications link performance metrics) that is indicative of radio-frequency performance of that device under test in receiving the broadcast radio-frequency test signals. Test host 26 may direct each of the multiple DUTs to compute the link performance metric data. If desired, each of the DUTs may be loaded with a test operating system. The test operating system may configure each DUT to automatically compute the performance metric data in response to receiving the test radio-frequency signals broadcast from signal generator 22.

For example, each DUT 10 may receive the test signals broadcast from signal generator 22 and may calculate a symbol error rate (SER), received signal strength indicator (RSSI), and other performance metrics based on the received test signals. These performance values may be retrieved from DUTs 10 by test host 26 over line 28 and may be stored in database 40.

At step 84, pass/fail criteria may be applied to each DUT 10. If a given DUT exhibits performance levels that fail to satisfy design criteria (e.g., the given DUT exhibits a SER that is greater than a predetermined threshold of 10%), the given DUT may be retested (step 86).

During retest procedures, test host 26 may direct signal generator 22 to broadcast downlink signals at a target output power level that takes into account the downlink path loss associated with the given DUT (if not equal to the desired downlink path loss selected during step 78) and test the receive capabilities of the given DUT using this new target output power level. For example, if $S_{TARG}$ is equal to −110 dBm and the path loss associated with the given failing DUT is equal to 10.2 dB, the new target output power level that is used to retest the failing DUT will be equal to −99.8 dBm (−110 plus 10.2).

If desired, retest procedures may involve retesting the failing DUT by configuring the failing DUT to measure standard protocol performance metrics such as frame error rate (FER), bit error rate (BER), packet error rate (PER), or other performance parameters. If desired, retest procedures may involve retesting the failing DUT in different positions in the test chamber, in another test station 13, etc. If the retested DUT fails to satisfy performance criteria a second time, the DUT may be permanently marked as a failing DUT. If the retested DUT performs satisfactorily during retest operations, the DUT may be marked as a passing DUT.

At step 88, if a given DUT exhibits performance levels that satisfy design criteria (e.g., the given DUT exhibits a SER that is less than the predetermined threshold of 10%), the given DUT will be marked as a passing DUT. If there are additional DUTs to be tested, processing may loop back to step 72 to test another set of DUTs, as indicated by path 90.

The foregoing is merely illustrative of the principles of this invention and various modifications can be made by those skilled in the art without departing from the scope and spirit of the invention.

What is claimed is:

1. A method of testing devices under test with a test station, wherein the test station includes a signal generator and a test chamber in which the devices under test are tested, the method comprising:

with the signal generator, broadcasting radio-frequency test signals to each of the devices under test in the test chamber in parallel;

with the test station, gathering performance metric data from each of the devices under test, wherein the performance metric data of each device under test is indicative of radio-frequency performance of that device under test in receiving the broadcast radio-frequency test signals;

obtaining respective path loss values associated with each of the devices under test in the test chamber;

selecting a minimum path loss value from the respective path loss values associated with each of the devices under test in the test chamber; and computing a target output power level based on the minimum path loss value.

2. The method defined in claim 1, wherein the test station further comprises a test host, the method further comprising:
with the test host, directing each of the devices under test to compute the performance metric data.

3. The method defined in claim 1, wherein the test station further comprises a test host, the method further comprising:
with the test host, directing each of the devices under test to compute the performance metric data, wherein the performance metric data is a symbol error rate, a frame error rate, a bit error rate, or a packet error rate.

4. The method defined in claim 1, further comprising:
loading each device under test with a test operating system, wherein the test operating system configures each device under test to compute the performance metric data by analyzing the radio-frequency test signals broadcast from the signal generator.

5. The method defined in claim 1, further comprising:
loading each device under test with a test operating system, wherein the test operating system configures each device under test to compute the performance metric data by analyzing the radio-frequency test signals broadcast from the signal generator and wherein the performance metric data is a symbol error rate, a frame error rate, a bit error rate, or a packet error rate.

6. The method defined in claim 1, further comprising:
directing the signal generator to broadcast radio-frequency initialization signals at a given output power level.

7. The method defined in claim 6, further comprising:
directing each of the devices under test to synchronize with the initialization signals broadcast from the signal generator.

8. The method defined in claim 7, wherein broadcasting the radio-frequency test signals to each of the devices under test in the test chamber in parallel comprises:
broadcasting the radio-frequency test signals to each of the devices under test in the test chamber at the target output power level, wherein the target output power level is less than the given output power.

9. The method defined in claim 8, further comprising:
in response to gathering the performance metric data from each of the devices under test, determining whether each of the devices under test satisfies design criteria.

10. The method defined in claim 9, further comprising:
in response to determining that a given device under test satisfies design criteria, marking the given device under test as a passing device under test.

11. The method defined in claim 10, further comprising:
in response to determining that a given device under test fails to satisfy design criteria, retesting the given device under test.

12. The method defined in claim 11, wherein retesting the given device under test comprises:
retesting the given device under test at a new location in the test chamber.

13. The method defined in claim 11, wherein retesting the given device under test comprises:
retesting the given device under test while the signal generator broadcasts the radio-frequency test signal at an output power level that is higher than the target output power level.

14. A radio-frequency test station for testing devices under test, wherein the radio-frequency test station comprises a signal generator and a test chamber in which the devices under test are tested, and wherein the radio-frequency test station is configured to perform the steps of claim 1.

* * * * *